United States Patent [19]
Weiss et al.

[11] Patent Number: 6,078,816
[45] Date of Patent: Jun. 20, 2000

[54] METHOD AND APPARATUS FOR ESTABLISHING CLEAR WIRELESS COMMUNICATION

[75] Inventors: Louis H. Weiss, New York, N.Y.; Michael Lang, Ridgewood, N.J.

[73] Assignees: Sony Corporation, Tokyo, Japan; Sony Electronics Inc., Park Ridge, N.J.

[21] Appl. No.: 09/082,429

[22] Filed: May 20, 1998

Related U.S. Application Data

[63] Continuation of application No. 08/710,588, Sep. 19, 1996, abandoned, which is a continuation of application No. 08/284,955, Aug. 2, 1994, abandoned.

[51] Int. Cl.[7] .................................................. H04Q 7/22
[52] U.S. Cl. ................ 455/450; 455/226.4; 455/67.1; 455/67.7
[58] Field of Search ................... 455/566, 510, 455/509, 513, 67.1, 67.7, 226.2, 226.3, 226.4, 450, 452, 406

[56] References Cited

U.S. PATENT DOCUMENTS

| | | | |
|---|---|---|---|
| 4,939,766 | 7/1990 | Umemoto et al. | 455/421 |
| 5,134,708 | 7/1992 | Mauri et al. | 455/566 |
| 5,203,011 | 4/1993 | Bane et al. | 455/510 |
| 5,303,297 | 4/1994 | Hills | 455/506 |
| 5,321,735 | 6/1994 | Breeden et al. | 455/406 |
| 5,465,397 | 11/1995 | Pickert | 455/161.3 |

*Primary Examiner*—Daniel S. Hunter
*Assistant Examiner*—Myron K. Wyche
*Attorney, Agent, or Firm*—Gary B. Goates

[57] ABSTRACT

A cellular communications device having circuitry for establishing clear wireless communications which includes a receiver-transmitter for receiving and transmitting wireless signals, a signal checker for comparing the signal strength received by the receiver-transmitter, controller for initiating and inhibiting wireless communications based upon results of the comparison made by the signal checker and a user input means for inputting user command information.

16 Claims, 3 Drawing Sheets

METHOD AND APPARATUS FOR ESTABLISHING CLEAR WIRELESS COMMUNICATION

This application is a continuation of application Ser. No. 08/710,588 filed on Sep. 19, 1996, now abandoned which is a filewrapper continuation of application Ser. No. 08/284,955 filed on Aug. 2, 1994, now abandoned which is hereby incorporated by reference.

FIELD OF THE INVENTION

The present invention relates to a method and apparatus for establishing clear cellular communications. More particularly, the present invention is directed to a method and apparatus for establishing clear cellular communications wherein the received signal strength is evaluated and initiation of a call or wireless communication is made only where the received signal strength meets, or exceeds, a predetermined level.

BACKGROUND

Common cellular telephones, Personal Communications Service (PCS) equipment and other personal communications devices (PCDs), are widely used in wireless communications. With these devices the quality, or clarity, of the wireless communications depends greatly upon having adequate signal strength for transmitting and receiving wireless communications. Generally, in the case of cellular telephones, when a user desires to place a cellular telephone call, the user enters a desired telephone number to be called and initiates the send, or transmit, action to place the call and thereby establish wireless communications. Upon establishing wireless communications, toll charges are incurred for the call, regardless of whether or not adequate signal strength exists for ensuring a high quality, or clear, communication.

Some common cellular telephones and personal communications devices do provide for a visual indication of the received signal strength level, or quality, by providing a received signal strength indicator or RSSI. The RSSI may be comprised of a display of a character or characters, such as multiple asterisks or dots, used to indicate the relative signal strength. For example, a display of one asterisk, or dot, could be used to correlate to an RSSI level of 1 while a display of four asterisk, or dots, could correlate to an RSSI level of 4. Table 1 sets out an examples RSSI levels relative to the actual received signal strength.

FIG. 1 illustrates a method of common cellular telephone or PCS equipment in initiating/completing wireless communications. The received signal strength indicator allows a user to visually determine that the signal strength may not be sufficient to ensure high quality communications. However, upon initiating a send action, a call will generally be completed by the cellular telephone or personal communication device, despite the fact that the RSSI indicates that the received signal strength may not be sufficient to ensure clear wireless communications. (See FIG. 1, steps 1–5). Thus, communications charges will be incurred for the call/communication regardless of whether or not it is clear, or of high quality. Of course, if a user notes that the RSSI indicates inadequate signal strength soon enough, the user may manually terminate the initiation of the wireless communications by actuating the end call or terminate function and thereby preclude charges for a call which would most likely be unclear.

The present invention is directed to overcoming the need for manual intervention in order to preclude initiation of wireless communications which may be of unsuitable quality. More particularly, the present invention seeks to overcome the above noted shortcomings of common cellular and personal communications devices by providing for a method of establishing clear cellular telephone communications which automatically precludes the initiation of a wireless communication where the received signal strength does not meet or exceed a predetermined reference value which correlates to a signal strength substantially sufficient to ensure clear, or high quality, communications.

SUMMARY OF THE INVENTION

The present invention relates to a method and apparatus for establishing clear cellular communications wherein there is provided a receiver-transmitter for receiving and transmitting wireless signals, and a signal check for checking, or comparing, the signal strength received by the receiver-transmitter. There is further provided a user input for inputting command information, a controller for controlling the receiver-transmitter in accordance with signals from the user input and the signal check, as well as, a display for displaying information, such as signal strength. The method of the present invention includes the steps of entering telephone number information, activating, or initiating, a send function, checking a received signal strength and outputting the received signal strength level to the display and establishing wireless communications where the received signal strength is greater than a predetermined value. Where the signal strength is determined to be less than the predetermined value, the signal strength information is output to the visual display, the user is then prompted for command input indicating the desire to continue communications despite the low signal level. Where no command input to continue is received, the process goes to checking the received signal strength and is repeated until it is determined that sufficient signal strength exists or user command input is received indicating the desire to continue with establishing wireless communications.

DESCRIPTION OF THE INVENTION

Figure 1:
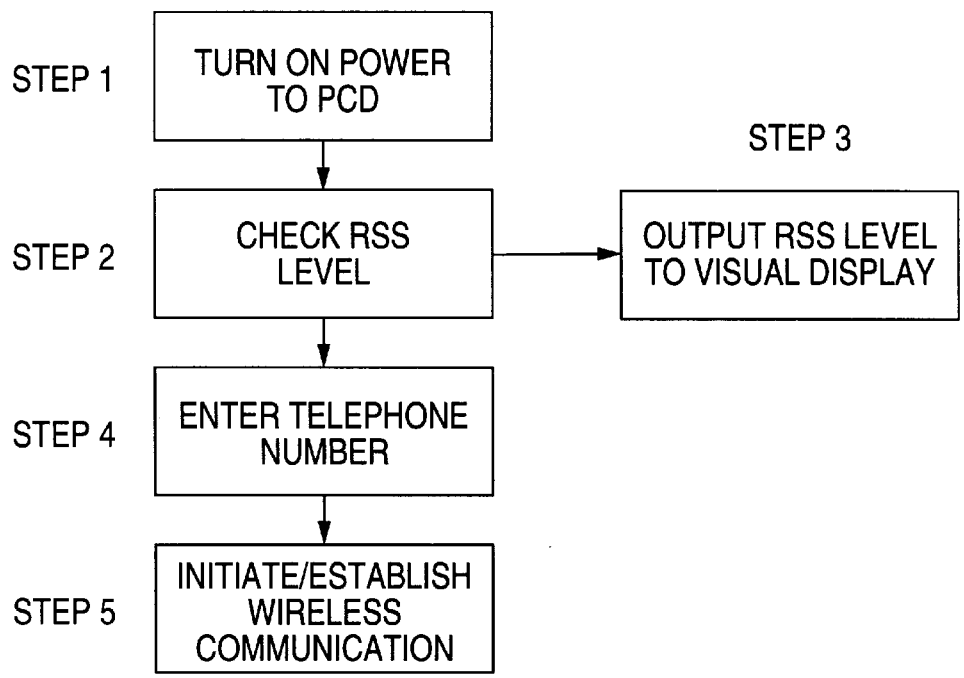
FIG. 1 is a flowchart illustrating the method of common cellular communications equipment.

With reference to the block diagram of FIG. 2 and the flowchart of FIG. 3, one embodiment of the apparatus of the present invention will be described. The present invention incorporates an antenna 20, a receiver-transmitter 22, a signal check 24, controller 28, keypad 25, memory 27, loudspeaker 21, microphone 23 and display 26. Antenna 20 is connected to an input of receiver/transmitter 22. Loudspeaker 21 and microphone 23 are connected to an output of receiver/transmitter 22. Signal check 24 is connected to receiver/transmitter 22. Keypad 25 is connected to controller 28. Controller 28 is connected to receiver/transceiver 22, signal check 24 and display 26. Memory 27 is connected to signal check 24.

Wireless signals are received and transmitted via antenna 20. Antenna 20 is connected to the input of receiver-transmitter 22. Signal check 24 is provided to determine, upon initiation of a call/send signal from keypad 25, whether or not the signal strength received by receiver-transmitter 22 from the wireless communications base station (received signal strength or RSS) equals or exceeds a predetermined level. The receive signal strength is monitored since it is generally known that where the signal strength received from the wireless communications base station meets a predetermined level, the transmitting signal transmitted by receiver-transmitter 22 will generally be sufficient to reach the wireless communication base station without undue degradation or signal loss thus allowing generally clear wireless communications. The predetermined level is selected to be high enough to substantially ensure that clear communications will be achieved upon initiation of wireless communications, for example −82 dBm H. The predetermined level may be stored as a reference value in a storage memory 27. This predetermined level may be user selectable.

Figure 2:
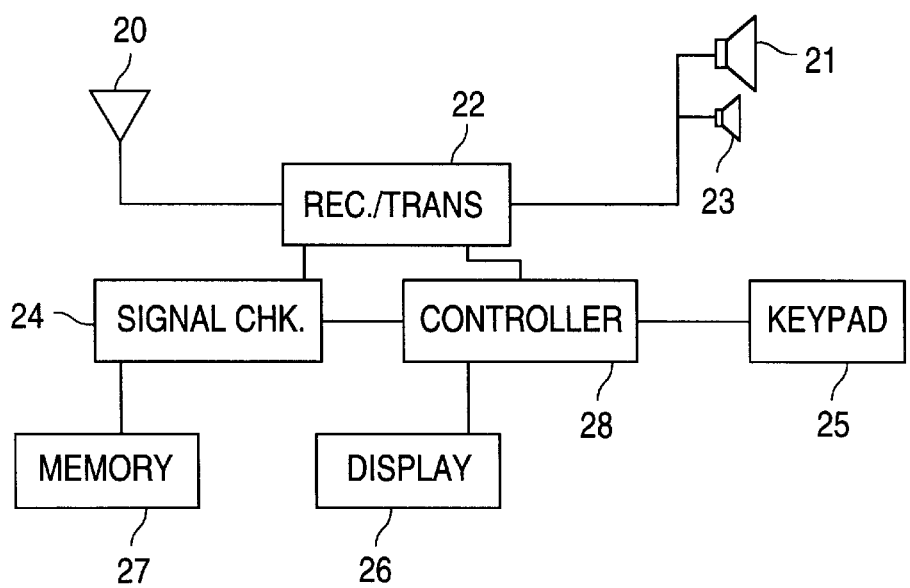
FIG. 2 is a block diagram of one embodiment of the apparatus of the present invention.
Figure 3:
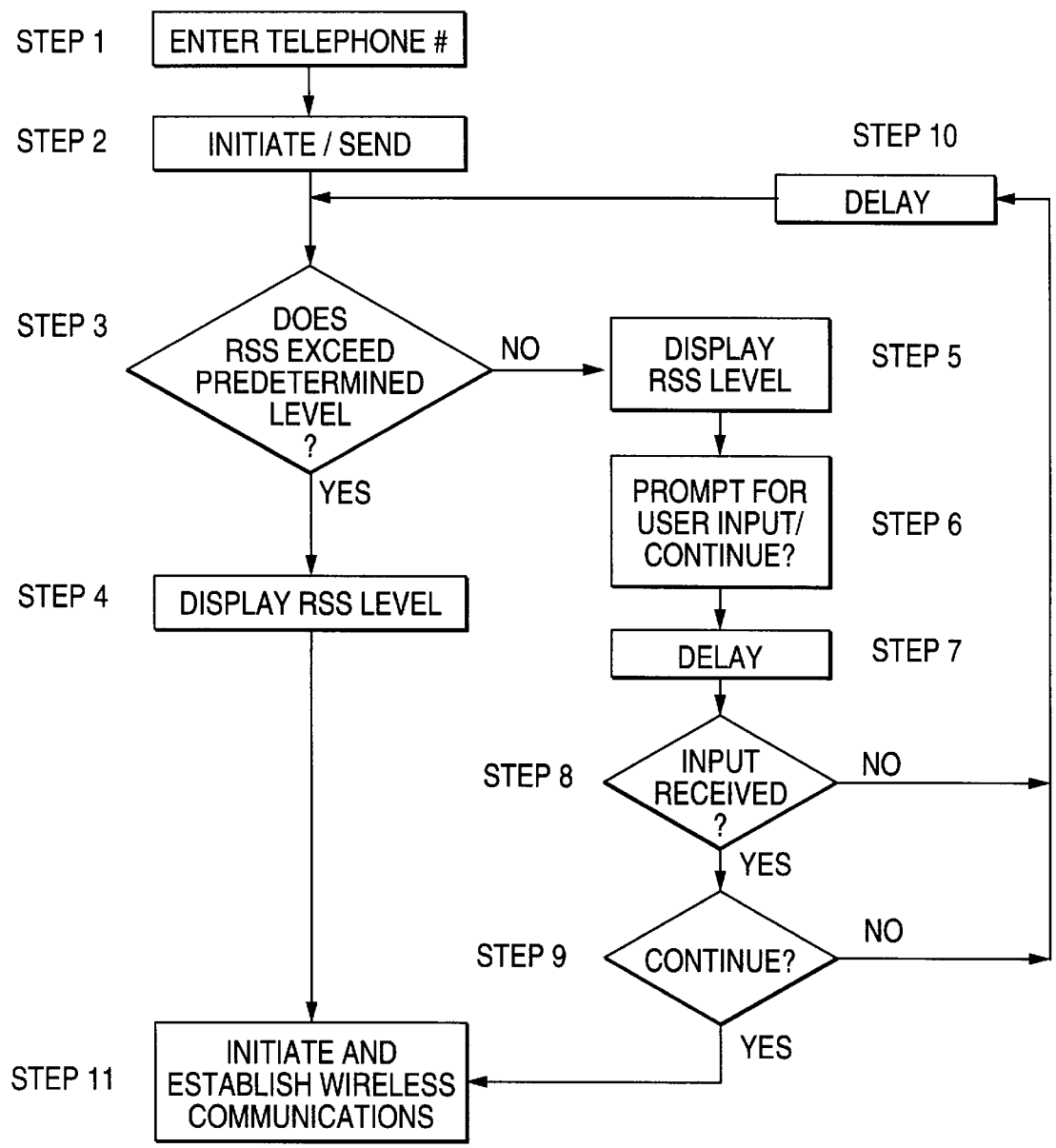
FIG. 3 is a flowchart illustrating one method of the present invention.

With reference to FIG. 2 and FIG. 3, a user enters a telephone or identification number of a party to be called and initiates the process of establishing wireless communications (step 1 and step 2). Where signal check 24 determines that the received signal strength level does not meet or exceed the predetermined reference value stored in storage memory 27 (step 3), a first signal is output to controller 28. As a result, controller 28 causes the measured received signal strength level to be displayed on display 26 for viewing by a user. Controller 28 then causes display 26 to display a visual indication prompting the user to provide command input via keypad 25, to indicate if it is desired to initiate wireless communications despite the low signal strength (step 5 and step 6). If the user inputs command information via keypad 25 indicating that initiation of wireless communications is not desired (step 9), or if no input at all is received (step 8) from keypad 25 within a predetermined time period (step 7), for example, 10 seconds, controller 28 will output a signal to preclude receiver-transmitter 22 from establishing wireless communications. Subsequently, after a second predetermined time period (step 10), for example, 10 seconds, has elapsed, controller 28 will automatically output a signal to cause signal check 24 to re-assess the received signal strength (back to step 3). If the received signal strength is equal to or greater than the predetermined reference value stored in storage memory 27, signal check 24 will cause a second signal to be output to controller 28. In response thereto, controller 28 will cause the received signal strength level or an indication that the signal strength is adequate to be displayed on display 26 (step 4). Further, controller 28 will output a signal to receiver-transmitter 22 to cause receiver-transmitter 22 to initiate and establish wireless communications (step 11). If signal check 24 re-assesses the received signal strength and determines that the received signal strength level is not equal or greater than the predetermined reference value stored in storage memory 27, a first signal will again be output to controller 28 whereupon the user will be prompted via a visual prompt on display 26 and/or an audible prompt produced by speaker 21 (step 6). Again, if no command input is received, or if the user provides command input via keypad 28 to indicate that initiation of wireless communications is not desired at the current measured received signal strength, the process of checking the received signal strength et seq. will be repeated after a predetermined period of time has elapsed. In the case where a user does provide command input via keypad 28 to indicate the desire to have wireless communications initiated, despite the low received signal strength level, controller 28 will output a signal to cause receiver-transmitter 22 to initiate wireless communications.

Receiver-transmitter 22 may be constructed so as to provide for transmission of wireless communications at various power, or signal strength, levels. These transmitted power signal strength levels may be user selectable. For example, receiver-transmitter 22 may provide for transmitting wireless signals at a high power transmitting signal level and a low power transmitting signal level. The high power signal level may be, for example 3 watts, while the low power transmitting signal level may be, for example 0.6 watts. It will be appreciated that the predetermined level stored in memory 27 may vary depending upon whether a high power transmitted signal or a low power transmitted signal is transmitted by receiver-transmitter 22, since a high power transmitted signal is generally more capable of transmitting a signal to the wireless communication base station without undue signal loss. Thus, the predetermined level stored in memory 27 may be lesser for a high power transmitting signal than for a low power transmitting signal.

Where signal check 24 determines that the received signal strength level is equal to or greater than the predetermined reference value stored in storage memory 27, a second signal will be output to controller 28. In response to this second signal, controller 28 will cause the measured received signal strength level to be displayed on display 26. Further, controller 28 will also output a signal to receiver-transmitter 22 to cause wireless communications to be initiated. Once wireless communications are established, a user may communicate via loudspeaker 21 and microphone 23.

Figure 4:
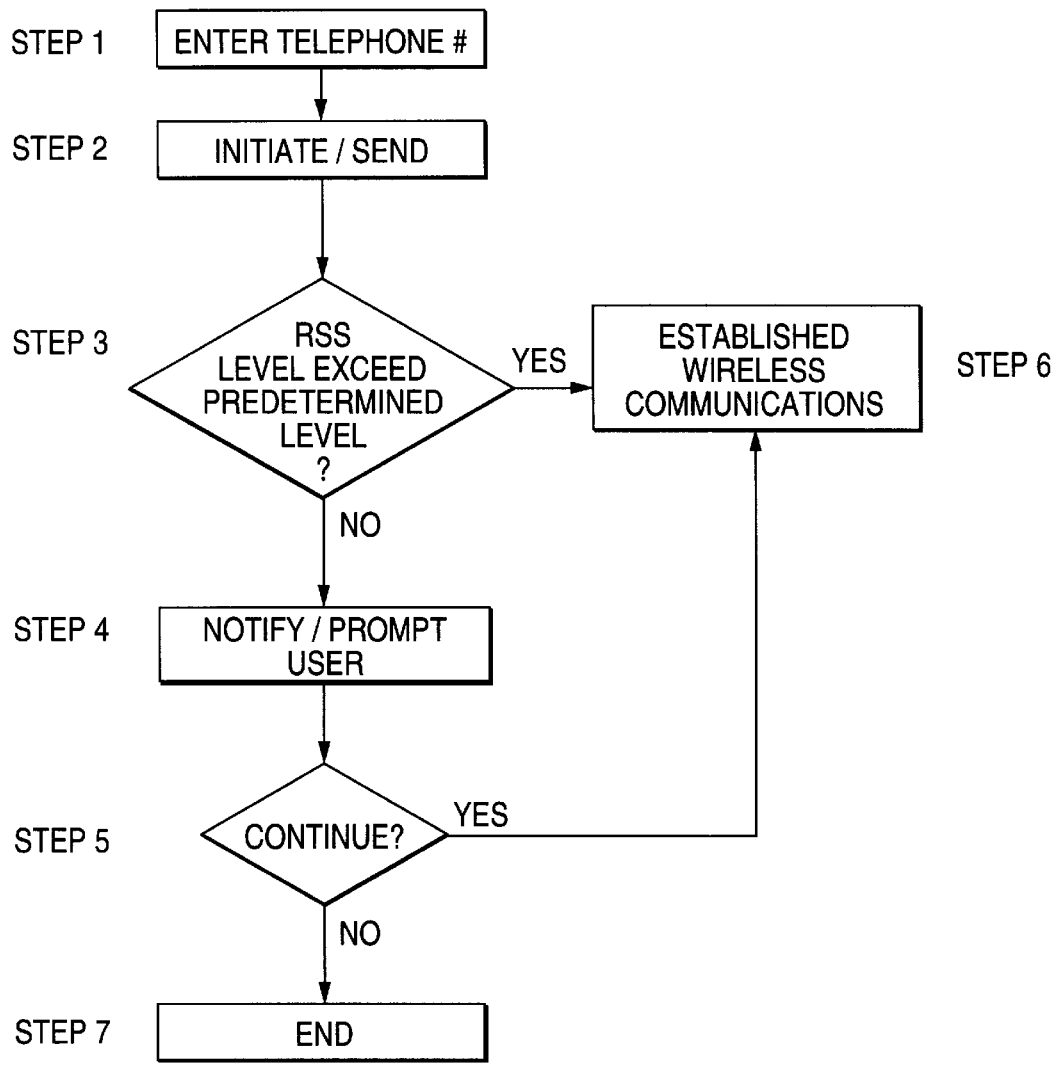
FIG. 4 is a flowchart illustrating another method of the present invention.

With reference to FIG. 4 an alternate method of the present invention is disclosed. Here, after a user has entered a telephone number (step 1) and initiated efforts to establish wireless communications (step 2), signal check 24 evaluates the received signal strength level received by transmitter-receiver 22 to determine whether or not the received signal strength level exceeds a predetermined reference level stored in memory 27 (step 3). If so, controller 28 outputs a signal to receiver-transmitter 22 to establish wireless communications (step 6). If not, a signal is output to notify a user of the low received signal strength level and to prompt the user to provide some indication of a desire to continue (step 4). This notification may be via a visual display on display 26 or, in an alternate embodiment, via an audible signal. Where the user does provide input via keypad 25 to indicate the desire to initiate and establish wireless communications despite the low received signal strength (step 5), then controller 28 outputs a signal to receiver-transmitter 22 to cause wireless communications to be established (step 6). Where the user provides no input of a desire to establish wireless communications despite the low received signal strength level, the process is ended (step 7). Alternately, the process of assessing the received signal strength (step 3) et seq. could be repeated.

With reference to Table 1 below, it will be noted that the received signal strength indicator (RSSI) levels may range, for example, from a level of 1 up through a level of 4. An RSSI level of 1 could, for example, represent the lowest or weakest level of signal strength while an RSSI level of 4 could, for example, represent the highest level of signal strength. An RSSI level of 1 could, for example, be used to represent a low signal strength of less than −101 dBm H. Further, an RSSI level of 4 could be used to represent a high signal strength of greater than −83 dBm H. It will be recognized and appreciated by those skilled in the art that any number of RSSI levels could be utilized and, further, that each RSSI level could represent any number of specific signal strength levels or range of signal strength levels.

TABLE 1

| RSSI | LEVEL |
|---|---|
| 4 | Greater than −83 dBmH |
| 3 | −83 dBmH to −91 dBmH |
| 2 | −92 dBmH to −101 dBmH |
| 1 | Less than −101 dBmH |

With regard to keypad 25, it will be appreciated that any number of user input devices, including voice actuated input devices, may be used to achieve the same results and functions of keypad 25. Additionally, it will be recognized that the apparatus of the present invention could be implemented in such a way that a user is prompted for command input through means other than the display means described. For instance, a predetermined audible signal could be used to alert/prompt the user for input of command information to allow wireless communications to be established.

Further, as an alternative to a user having to confirm the desire to initiate a call with low RSSI, the user could be required to interrupt the initiation of wireless communications if warned of low RSS, otherwise the call would proceed. Controller 28 could be implemented as hard wired logic or programmed processor.

In view of the above description, it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A device for wireless communications having communications charges, comprising:

a transceiver means for receiving and transmitting wireless signals;

signal check means for checking a received signal strength of said wireless signals received by said transceiver means to determine whether or not said received signal strength is equal to or greater than a reference value, and for providing an output signal based on said determination;

user input means for inputting command information, said command information including an initiation signal representing a user's desire to initiate said wireless communications;

controller means for placing said device in an initial communication transmitting state in response to said initiation signal unless said output signal indicates that said received signal strength is less than said reference value, thereby precluding said communications charges for those of said wireless communications whose quality is at risk because said received signal strength is less than said reference value; and display means for providing a visual display of said received signal strength.

2. The device according to claim 1, wherein said device comprises a cellular telephone.

3. The device according to claim 1, wherein said device comprises a PCS device.

4. A cellular telephone device for wireless communications having communications charges, comprising:

transceiver means for receiving and transmitting wireless communication signals;

controller means for controlling said transceiver in initiating said wireless communications;

user input means for inputting user command information, said user command information comprising a signal representing a user's desire to initiate wireless communications; and signal checking means for comparing the received signal strength of said wireless communication signals received by said transceiver with a reference level, and for outputting a first signal in response to said comparison, the assertion of said first signal indicating that the received signal strength of said wireless communication signals received by said transceiver is less than said reference level;

said controller means placing said cellular telephone device in an initial communications transmitting state in response to said user command information provided that said first signal is not asserted, thereby precluding said communications charges for those of said wireless communications whose quality is at risk because said received signal strength is less than said reference value.

5. The cellular telephone device according to claim 4, wherein said controller means further comprises prompting means for prompting said user for input of said command information.

6. The cellular telephone device according to claim 5, wherein said prompting means comprises a visual display.

7. The cellular telephone device according to claim 5, wherein said prompting means comprises an audible alarm.

8. The cellular telephone device according to claim 4, wherein said user command information further comprises a telephone number.

9. The cellular telephone device in accordance with claim 4, further comprising a display for displaying said received signal strength.

10. The cellular telephone device according to claim 9, wherein said controller means also controls said display.

11. A method for establishing cellular telephone communications comprising:

entering a desired telephone number through a user input device;

comparing a received signal strength level with a reference value through a signal check device;

outputting said received signal strength level to a visual display;

placing said cellular telephone device in an initial communication transmitting state if said received signal level is greater than said reference value; and, if said received signal strength level is less than said reference value, then;

prompting for a user input;

placing said cellular telephone device in an initial communication transmitting state when said user input indicates a desire to establish said cellular telephone communications despite said received signal strength level being less than said reference value;

re-checking said received signal strength level and comparing said re-checked received signal strength level with said reference value either when said user input indicates a desire not to establish said cellular telephone communications or when no user input is received after a time period has elapsed; and, placing said cellular telephone device in said initial communication transmitting state when said received signal strength level becomes equal to or greater than said reference value.

12. A cellular telephone device, comprising:

transceiver means for receiving and transmitting wireless signals;

signal checking means for comparing a received signal strength of said wireless signals with a threshold;

input means for producing an override signal in response to an input from a user, said override signal indicating that said user wishes to initiate a telephone call despite said comparison indicating that said received signal strength is less than said threshold; and means for inhibiting initiation of said telephone call in the event said comparison indicates that said received signal strength is less than said threshold and said override signal indicates that said user does not wish to override and initiate said telephone call.

13. The cellular telephone device according to claim 12, further comprising prompting means for prompting a user to indicate whether to continue initiation of said telephone call where said signal strength is less than said stored threshold.

14. The cellular telephone device according to claim 12, further comprising a visual display for displaying a level corresponding to said received signal strength.

15. A cellular telephone device, comprising:

transceiver means for receiving and transmitting wireless signals;

signal checking means for comparing a received signal strength of said wireless signals with a threshold;

input means for producing an override signal in response to an input from a user, said override signal indicating that a user wishes to initiate a telephone call despite said comparison indicating that said received signal strength is less than said threshold;

wherein when said received signal signal is less than said threshold and said override signal indicates that said user does not wish to initiate said telephone call, said control means inhibits initiation of said telephone call.

16. A method of operation of a wireless communication device having a receiver and a transmitter, comprising:

receiving a communication signal having a received signal strength at said receiver;

comparing said received signal strength with a threshold value;

inputting a response including an override signal indicating that said received signal strength is less than said threshold; and inhibiting initiation of a telephone call by said transmitter when said received signal strength is less than said threshold value and said override signal indicates that said user does not wish to initiate a telephone call.

\* \* \* \* \*